United States Patent
Nakamura

(10) Patent No.: US 11,230,985 B2
(45) Date of Patent: Jan. 25, 2022

(54) CONTROL DEVICE OF INTERNAL COMBUSTION ENGINE, IN-VEHICLE ELECTRONIC CONTROL UNIT, MACHINE LEARNING SYSTEM, CONTROL METHOD OF INTERNAL COMBUSTION ENGINE, MANUFACTURING METHOD OF ELECTRONIC CONTROL UNIT, AND OUTPUT PARAMETER CALCULATION DEVICE

(71) Applicant: TOYOTA JIDOSHA KABUSHIKI KAISHA, Aichi-ken (JP)

(72) Inventor: Toshihiro Nakamura, Shizuoka-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/726,069

(22) Filed: Dec. 23, 2019

(65) Prior Publication Data

US 2020/0248641 A1    Aug. 6, 2020

(30) Foreign Application Priority Data

Feb. 1, 2019    (JP) .............................. JP2019-017146

(51) Int. Cl.
*G01M 17/00*        (2006.01)
*F02D 41/14*        (2006.01)
(Continued)

(52) U.S. Cl.
CPC ..... *F02D 41/1405* (2013.01); *F02D 41/2451* (2013.01); *F02D 41/2477* (2013.01); *G06N 3/08* (2013.01)

(58) Field of Classification Search
USPC ......... 123/486, 488; 701/29, 36; 700/29, 48, 700/117; 702/104, 116, 182, 189
See application file for complete search history.

(56) References Cited

U.S. PATENT DOCUMENTS

2008/0300709 A1    12/2008  Collette, III et al.
2010/0050025 A1*   2/2010   Grichnik ................ G05B 17/02
                                                       714/47.2
(Continued)

FOREIGN PATENT DOCUMENTS

JP    H7146852 A    6/1995
JP    H11224106 A   8/1999
(Continued)

OTHER PUBLICATIONS

Huanfei MA, et al., "Randomly distributed embedding making short-term high-dimensional data predictable", PNAS Latest Articles, 115 (43), Oct. 23, 2018, 9pp.

*Primary Examiner* — John Kwon
(74) *Attorney, Agent, or Firm* — Hauptman Ham, LLP

(57) ABSTRACT

A control device of an internal combustion engine includes a parameter acquisition unit that acquires a plurality of input parameters, a calculation unit that calculates at least one output parameter using a neural network model, and a controller that controls the internal combustion engine. The neural network model includes a plurality of neural network units and an output layer. Each of the neural network units includes one input layer and at least one intermediate layer. The neural network model inputs different combinations of input parameters selected from the input parameters to each of the input layers of the neural network units such that a total number of input parameters to be input to the neural network units is larger than the number of the input parameters.

9 Claims, 10 Drawing Sheets

(51) Int. Cl.
*F02D 41/24* (2006.01)
*G06N 3/08* (2006.01)

(56) References Cited

U.S. PATENT DOCUMENTS

| | | |
|---|---|---|
| 2018/0297578 A1 | 10/2018 | Park |
| 2018/0348777 A1 | 12/2018 | Kawabe et al. |
| 2020/0233427 A1* | 7/2020 | Fukuoka .................. G06K 9/66 |

FOREIGN PATENT DOCUMENTS

| | | |
|---|---|---|
| JP | 200349702 A | 2/2003 |
| JP | 2011-54200 A | 3/2011 |
| JP | 2018206036 A | 12/2018 |

* cited by examiner

CONTROL DEVICE OF INTERNAL COMBUSTION ENGINE, IN-VEHICLE ELECTRONIC CONTROL UNIT, MACHINE LEARNING SYSTEM, CONTROL METHOD OF INTERNAL COMBUSTION ENGINE, MANUFACTURING METHOD OF ELECTRONIC CONTROL UNIT, AND OUTPUT PARAMETER CALCULATION DEVICE

INCORPORATION BY REFERENCE

The disclosure of Japanese Patent Application No. 2019-017146 filed on Feb. 1, 2019 including the specification, drawings and abstract is incorporated herein by reference in its entirety.

BACKGROUND

1. Technical Field

The disclosure relates to a control device of an internal combustion engine, an in-vehicle electronic control unit, a machine learning system, a control method of an internal combustion engine, a manufacturing method of an electronic control unit, and an output parameter calculation device.

2. Description of Related Art

The related art discloses that a predetermined output parameter is calculated based on a predetermined input parameter using a neural network model including an input layer, a hidden layer (intermediate layer), and an output layer (for example, Japanese Unexamined Patent Application Publication No. 2011-054200 (JP 2011-054200 A)).

SUMMARY

In the neural network model, a parameter that correlates with the output parameter is used as the input parameter to be input to the input layer. Basically, since an information amount for calculating the output parameter is larger as the number of input parameters is larger, calculation accuracy of the output parameter is improved.

However, not all types of input parameters can be acquired. For this reason, the improvement of the calculation accuracy of the output parameter is desired with limited types of input parameters.

The disclosure provides a control device of an internal combustion engine, an in-vehicle electronic control unit, a machine learning system, a control method of an internal combustion engine, a manufacturing method of an electronic control unit, and an output parameter calculation device that improve calculation accuracy of an output parameter without increasing types of input parameters when the output parameter is calculated based on the input parameters using a neural network model.

The gist of the disclosure is as follows.

A first aspect of the disclosure relates to a control device of an internal combustion engine including a parameter acquisition unit configured to acquire a plurality of input parameters, a calculation unit configured to calculate at least one output parameter based on the input parameters acquired by the parameter acquisition unit using a neural network model, and a controller configured to control the internal combustion engine based on the at least one output parameter calculated by the calculation unit. The neural network model includes a plurality of neural network units and an output layer that outputs the at least one output parameter based on outputs of the neural network units. Each of the neural network units includes one input layer and at least one intermediate layer. The neural network model is configured to input different combinations of input parameters selected from the input parameters to each of the input layers of the neural network units such that a total number of input parameters to be input to the neural network units is larger than the number of the input parameters.

In the first aspect of the disclosure, the number of the input parameters may be n. The neural network model may include $_nC_k$ neural network units to which $_nC_k$ combinations of input parameters selected from the input parameters are input, where n may be three or more and k may be two to n−1.

The first aspect of the disclosure may further include a learning unit configured to perform learning of the neural network model in a vehicle mounted with the internal combustion engine. The parameter acquisition unit may be configured to acquire the input parameters and the at least one output parameter. The learning unit may be configured to perform the learning of the neural network model using a training data set including a combination of the input parameters and the at least one output parameter acquired by the parameter acquisition unit.

A second aspect of the disclosure relates to an in-vehicle electronic control unit including a parameter acquisition unit configured to acquire a plurality of input parameters, and a calculation unit configured to calculate at least one output parameter based on the input parameters acquired by the parameter acquisition unit using a neural network model transmitted from a server outside a vehicle to the vehicle. The neural network model includes a plurality of neural network units and an output layer that outputs the at least one output parameter based on outputs of the neural network units. Each of the neural network units includes one input layer and at least one intermediate layer. The neural network model is configured to input different combinations of input parameters selected from the input parameters to each of the input layers of the neural network units such that a total number of input parameters to be input to the neural network units is larger than the number of the input parameters.

A third aspect of the disclosure relates to a machine learning system including an electronic control unit provided in a vehicle, a communication device provided in the vehicle, and a server outside the vehicle. The electronic control unit includes a parameter acquisition unit configured to acquire a plurality of input parameters and at least one output parameter and transmit the input parameters and the at least one output parameter to the server through the communication device, and a calculation unit configured to calculate the at least one output parameter based on the input parameters acquired by the parameter acquisition unit using a neural network model transmitted from the server. The server is configured to perform learning of the neural network model using a training data set including a combination of the input parameters and the at least one output parameter acquired by the parameter acquisition unit. The neural network model includes a plurality of neural network units and an output layer that outputs the at least one output parameter based on outputs of the neural network units. Each of the neural network units includes one input layer and at least one intermediate layer. The neural network model is configured to input different combinations of input parameters selected from the input parameters to each of the input layers of the neural network units such that a total number of input parameters to be input to the neural network units is larger than the number of the input parameters.

A fourth aspect of the disclosure relates to a control method of an internal combustion engine including acquiring a plurality of input parameters, calculating at least one output parameter based on the input parameters using a neural network model, and controlling the internal combustion engine based on the at least one output parameter. The neural network model includes a plurality of neural network units and an output layer that outputs the at least one output parameter based on outputs of the neural network units. Each of the neural network units includes one input layer and at least one intermediate layer. The neural network model is configured to input different combinations of input parameters selected from the input parameters to each of the input layers of the neural network units such that a total number of input parameters to be input to the neural network units is larger than the number of the input parameters.

A fifth aspect of the disclosure relates to a manufacturing method of an electronic control unit including performing learning of a neural network model using a training data set including a combination of measured values of a plurality of input parameters and measured values of at least one output parameter corresponding to the measured values, and mounting the neural network model in the electronic control unit. The neural network model includes a plurality of neural network units and an output layer that outputs the at least one output parameter based on outputs of the neural network units. Each of the neural network units includes one input layer and at least one intermediate layer. The neural network model is configured to input different combinations of input parameters selected from the input parameters to each of the input layers of the neural network units such that a total number of input parameters to be input to the neural network units is larger than the number of the input parameters.

A sixth aspect of the disclosure relates to an output parameter calculation device including a parameter acquisition unit configured to acquire a plurality of input parameters, and a calculation unit configured to calculate at least one output parameter based on the input parameters acquired by the parameter acquisition unit using a neural network model. The neural network model includes a plurality of neural network units and an output layer that outputs the at least one output parameter based on outputs of the neural network units. Each of the neural network units includes one input layer and at least one intermediate layer. The neural network model is configured to input different combinations of input parameters selected from the input parameters to each of the input layers of the neural network units such that a total number of input parameters to be input to the neural network units is larger than the number of the input parameters.

According to each aspect of the disclosure, when the output parameter is calculated based on the input parameters using the neural network model, it is possible to improve the calculation accuracy of the output parameter without increasing the types of input parameters.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Figure 1:
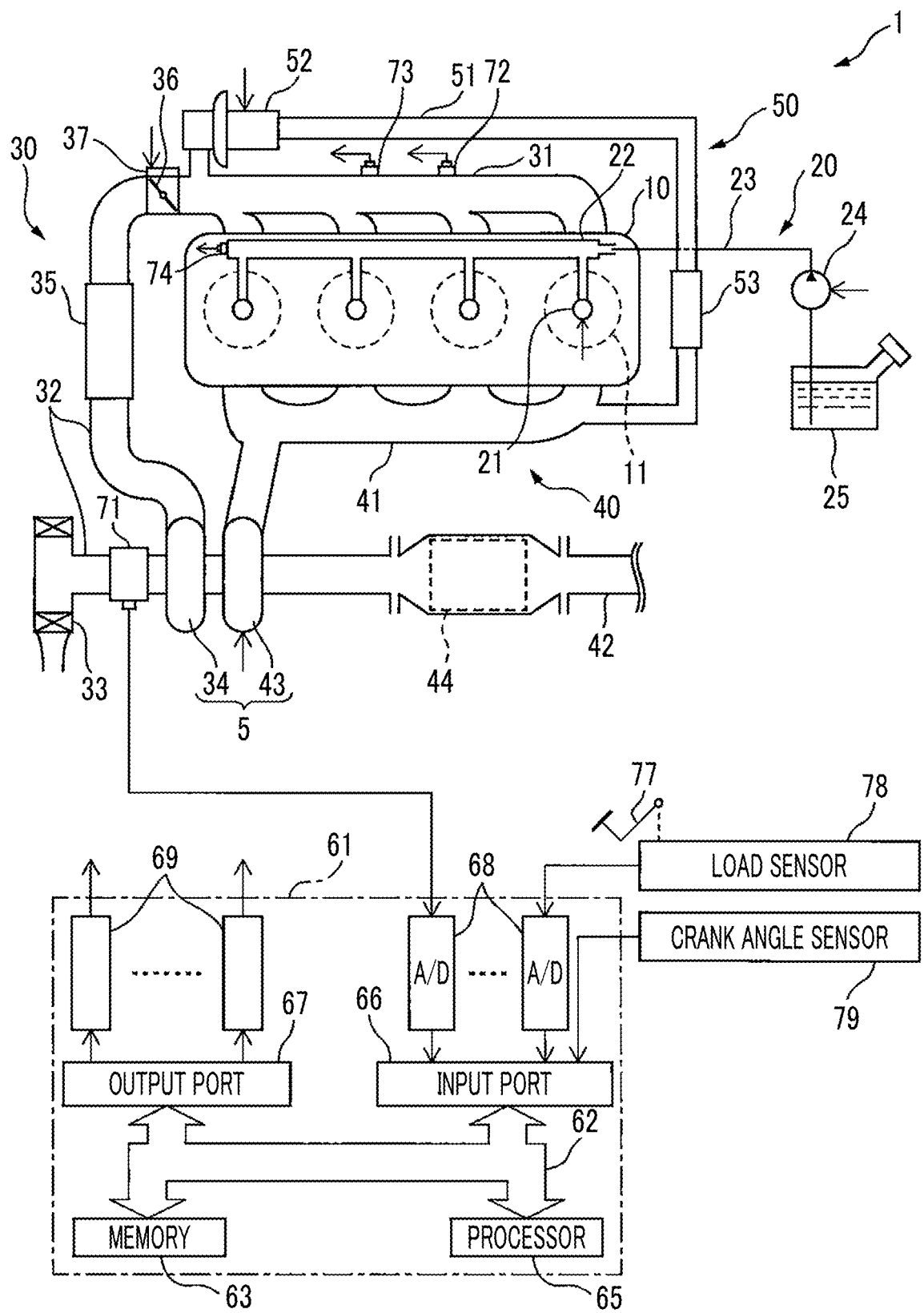
FIG. 1 is a diagram schematically showing an internal combustion engine to which a control device of the internal combustion engine according to a first embodiment is adapted.

Hereinafter, embodiments of the disclosure will be described in detail with reference to drawings. In the following description, the same reference numeral is assigned to a similar component.

First Embodiment

First, a first embodiment of the disclosure will be described with reference to FIGS. 1 to 9.

Description of Whole Internal Combustion Engine

FIG. 1 is a diagram schematically showing an internal combustion engine to which a control device of the internal combustion engine according to the first embodiment is adapted. An internal combustion engine 1 shown in FIG. 1 is a compression self-ignition internal combustion engine (diesel engine) and is mounted on a vehicle.

The internal combustion engine 1 includes an engine body 10, a fuel supply device 20, an intake system 30, an exhaust system 40, and an exhaust gas recirculation (EGR) system 50. The engine body 10 includes a cylinder block in which a plurality of cylinders 11 is formed, a cylinder head in which an intake port and an exhaust port are formed, and a crankcase. In the embodiment, the number of cylinders 11 is four. A piston is disposed in each cylinder 11, and each cylinder 11 communicates with the intake port and the exhaust port. The cylinder head is provided with an intake valve configured to open and close the intake port and an exhaust valve configured to open and close the exhaust port.

The fuel supply device 20 includes a fuel injection valve 21, a common rail 22, a fuel supply pipe 23, a fuel pump 24, and a fuel tank 25. The fuel injection valve 21 is connected to the fuel tank 25 through the common rail 22 and the fuel supply pipe 23. The fuel injection valve 21 is disposed on the cylinder head so as to directly inject fuel into a combustion chamber of each cylinder 11. The fuel injection valve 21 is a so-called in-cylinder fuel injection valve. The fuel pump 24 that pressure-feeds the fuel in the fuel tank 25 is disposed in the fuel supply pipe 23. The fuel pressure-fed by the fuel pump 24 is supplied to the common rail 22 through the fuel supply pipe 23 and directly injected from the fuel injection valve 21 into the combustion chamber of each cylinder 11. A pressure of the fuel in the common rail 22 is adjusted by changing an output of the fuel pump 24.

In the internal combustion engine 1, a so-called multi-stage injection is performed by the fuel injection valve 21. Specifically, two pilot injections (a first pilot injection and a second pilot injection) and one main injection are performed in one cycle.

The intake system 30 includes the intake port, an intake manifold 31, an intake pipe 32, an air cleaner 33, a compressor 34 of a turbocharger 5, an intercooler 35, and a throttle valve 36. The intake port, the intake manifold 31, and the intake pipe 32 form an intake passage that guides air into the cylinder 11.

The intake port of each cylinder 11 communicates with the air cleaner 33 through the intake manifold 31 and the intake pipe 32. The compressor 34 that compresses and discharges intake air that flows through the intake pipe 32 and the intercooler 35 that cools the air compressed by the compressor 34 are provided in the intake pipe 32. The throttle valve 36 can be rotated by a throttle valve drive actuator 37 to change an opening area of the intake passage.

The exhaust system 40 includes the exhaust port, an exhaust manifold 41, an exhaust pipe 42, a turbine 43 of the turbocharger 5, and a diesel particulate filter (DPF) 44. The exhaust port, the exhaust manifold 41 and the exhaust pipe 42 form an exhaust passage for exhausting exhaust gas generated by combustion of an air-fuel mixture in the combustion chamber.

The exhaust port of each cylinder 11 communicates with the DPF 44 through the exhaust manifold 41 and the exhaust pipe 42. The exhaust pipe 42 is provided with a turbine 43 rotatably driven by the energy of the exhaust gas. When the turbine 43 is rotatably driven, the compressor 34 rotates accompanying the rotation and thus the intake air is compressed. In the embodiment, the turbine 43 is provided with a variable nozzle. When an opening degree of the variable nozzle is changed, a flow velocity of the exhaust gas to be supplied to a turbine blade of the turbine 43 changes. As a result, a rotational speed of the turbine 43 changes.

The DPF 44 collects particulate matter (PM) in the exhaust gas. The exhaust system 40 may include another exhaust gas control device instead of or in addition to the DPF 44. Examples of another exhaust gas control device are a selective reduction type NOx reduction catalyst (selective catalytic reduction (SCR) catalyst), a NOx storage reduction catalyst, and an oxidation catalyst.

The EGR system 50 supplies a part of the exhaust gas discharged from the engine body 10 to the intake passage to the intake passage. The EGR system 50 includes an EGR pipe 51, an EGR control valve 52, and an EGR cooler 53. The EGR pipe 51 is connected to the exhaust manifold 41 and the intake manifold 31 and allows the exhaust manifold 41 and the intake manifold 31 to communicate with each other. The EGR pipe 51 is provided with the EGR cooler 53 that cools the EGR gas flowing in the EGR pipe 51. The EGR pipe 51 is provided with the EGR control valve 52 that can change the opening area of an EGR passage formed by the EGR pipe 51. The opening degree of the EGR control valve 52 is controlled to adjust a flow rate of the EGR gas to be recirculated from the exhaust manifold 41 to the intake manifold 31. As a result, an EGR rate changes. The EGR rate is a ratio of an EGR gas amount to a total gas amount to be supplied into the cylinder 11 (sum of a fresh air amount and the EGR gas amount).

The configuration of the internal combustion engine 1 is not limited to the above configuration. Therefore, the specific configuration of the internal combustion engine such as the cylinder arrangement, the fuel injection mode, the intake and exhaust system configuration, the valve mechanism configuration, the turbocharger configuration, and the presence or absence of the turbocharger may be different from the configuration shown in FIG. 1.

Control Device of Internal Combustion Engine

A vehicle mounted with the internal combustion engine 1 is provided with an electronic control unit (ECU) 61. Various controls of the internal combustion engine 1 are executed by the ECU 61 based on outputs of various sensors provided in the internal combustion engine 1. The ECU 61 is an example of the control device of the internal combustion engine. In the embodiment, one ECU 61 is provided, but a plurality of ECUs may be provided for each function.

The ECU 61 is configured of a digital computer and includes a memory 63, a processor 65, an input port 66, and an output port 67 that are connected to each other through a bidirectional bus 62. The memory 63 includes a volatile memory (for example, RAM) and a non-volatile memory (for example, ROM) and stores a program executed by the processor 65, various pieces of data used when various processes are executed by the processor 65, and the like.

The outputs of various sensors are input to the input port 66. In the embodiment, the outputs of an air flow meter 71, an intake air temperature sensor 72, an intake air pressure sensor 73, a fuel pressure sensor 74, and a load sensor 78 are input to the input port 66 through a corresponding analog to digital (AD) converter 68.

The air flow meter 71 is disposed in the intake pipe 32 between the air cleaner 33 and the compressor 34 and measures the flow rate of air (fresh air) in the intake pipe 32. The intake air temperature sensor 72 is disposed in the intake manifold 31 and measures the temperature of the intake air (fresh air and EGR gas in the embodiment) in the intake manifold 31. The intake air pressure sensor 73 is disposed in the intake manifold 31 and measures the pressure of intake air in the intake manifold 31.

The fuel pressure sensor 74 is disposed on the common rail 22 and measures the pressure of the fuel in the common rail 22, that is, the pressure of the fuel to be supplied to the fuel injection valve 21. The load sensor 78 is connected to an accelerator pedal 77 provided in the vehicle and generates an output voltage proportional to a depression amount of the accelerator pedal 77. The processor 65 calculates an engine load based on the output of the load sensor 78.

The input port 66 is connected to a crank angle sensor 79 that generates an output pulse every time a crankshaft rotates, for example, 10° and receives the output pulse. The processor 65 measures an engine speed based on the output of the crank angle sensor 79.

On the other hand, the output port 67 is connected to various actuators of the internal combustion engine 1 through a corresponding drive circuit 69. In the embodiment, the output port 67 is connected to the variable nozzle of the turbine 43, the fuel injection valve 21, the fuel pump 24, the throttle valve drive actuator 37, and the EGR control valve 52. The ECU 61 outputs a control signal from the output port 67 to control the various actuators.

Figure 2:
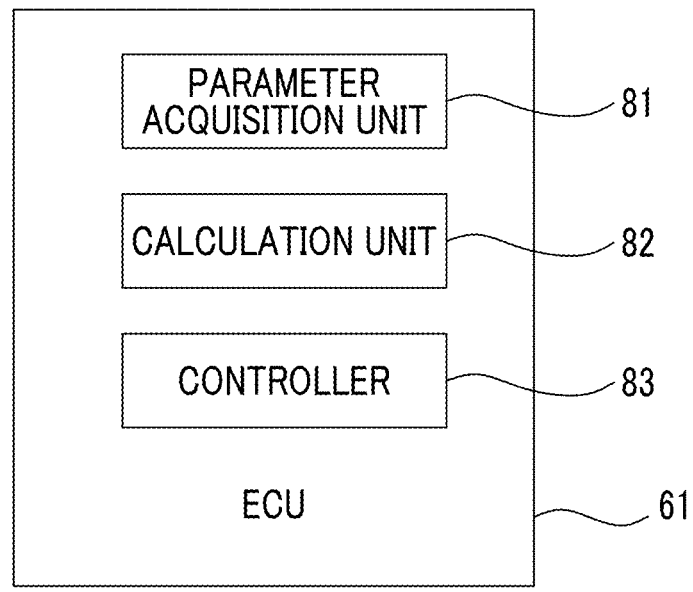
FIG. 2 is a functional block diagram of an electronic control unit (ECU) according to the first embodiment.

FIG. 2 is a functional block diagram of the ECU 61 in the first embodiment. In the embodiment, the ECU 61 includes a parameter acquisition unit 81, a calculation unit 82, and a controller 83. The parameter acquisition unit 81, the calculation unit 82, and the controller 83 are functional blocks that are realized when the processor 65 of the ECU 61 executes the program stored in the memory 63 of the ECU 61.

The parameter acquisition unit 81 acquires a plurality of input parameters. The calculation unit 82 calculates at least one output parameter based on the input parameters acquired by the parameter acquisition unit 81 using a neural network model. The controller 83 controls the internal combustion engine 1 based on the at least one output parameter calculated by the calculation unit 82.

Outline of Neural Network Model

Figure 3:
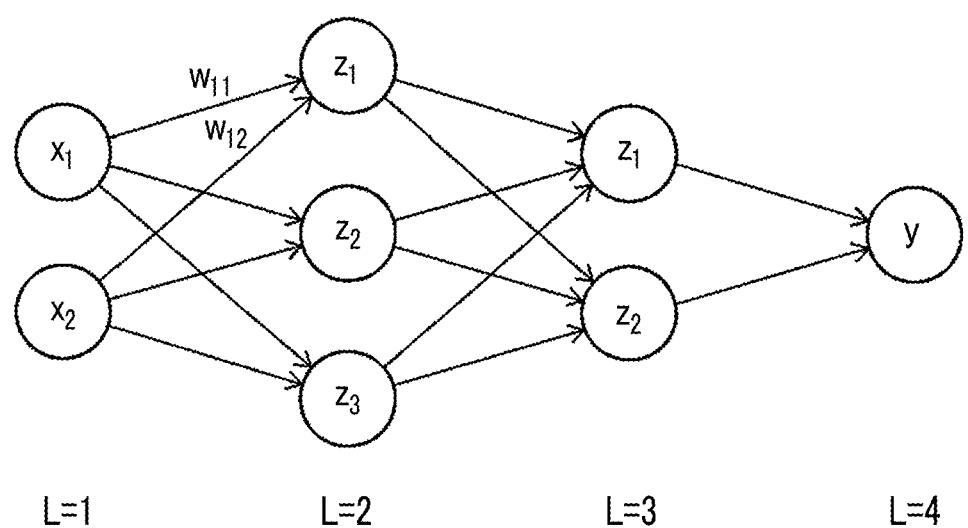
FIG. 3 is a diagram showing an example of a neural network having a simple configuration.

First, an outline of the neural network model will be described with reference to FIG. 3. FIG. 3 is a diagram showing an example of the neural network model having a simple configuration.

A circle in FIG. 3 represents an artificial neuron. The artificial neuron is commonly referred to as a node or a unit (referred to as "nodes" in the specification). In FIG. 3, L=1 indicates an input layer, L=2 and L=3 indicate hidden layers, and L=4 indicates an output layer. The hidden layer is also referred to as an intermediate layer.

In FIG. 3, $x_1$ and $x_2$ indicate respective nodes of the input layer (L=1) and output values from the nodes, and y indicates a node of the output layer (L=4) and an output value from the node. Similarly, $z_1^{(L=2)}$, $z_2^{(L=2)}$, and $z_3^{(L=2)}$ indicate respective nodes of the hidden layer (L=2) and output values from the nodes, and $z_1^{(L=3)}$ and $z_2^{(L=3)}$ indicate respective nodes of the hidden layer (L=3) and output values from the nodes.

An input is output as it is at each node of the input layer. On the other hand, the output values $x_1$ and $x_2$ of respective nodes of the input layer are input to respective nodes of the hidden layer (L=2), and a total input value u is calculated using weight w and bias b corresponding to each of the output values at respective nodes of the hidden layer (L=2). For example, a total input value $u_k^{(L=2)}$ calculated at each node indicated by $z_k^{(L=2)}$ (k=1, 2, 3) of the hidden layer (L=2) in FIG. 3 is as the following equation (M is the number of nodes in the input layer).

[Formula 1]

$$u_k^{(L=2)} = \sum_{m=1}^{M} (x_m \cdot w_{km}^{(L=2)}) + b_k$$

Next, the total input value $u_k^{(L=2)}$ is converted by an activation function f and is output from each node indicated by $z_k^{(L=2)}$ of the hidden layer (L=2) as the output value $z_k^{(L=2)}(=f(u_k^{(L=2)}))$. On the other hand, the output values $z_1^{(L=2)}$, $z_2^{(L=2)}$, and $z_3^{(L=2)}$ of respective nodes of the hidden layer (L=2) are input to respective nodes of the hidden layer (L=3), and a total input value u(=Σz·w+b) is calculated using weight w and bias b corresponding to each of the output values at respective nodes of the hidden layer (L=3). The total input values u are similarly converted by an activation function and are output as output values $z_1^{(L=3)}$ and $z_2^{(L=3)}$ from respective nodes of the hidden layer (L=3). The activation function is, for example, a sigmoid function 6.

The output values $z_1^{(L=3)}$ and $z_2^{(L=3)}$ of respective nodes of the hidden layer (L=3) are input to the node of the output layer (L=4). A total input value u(Σz·w+b) is calculated using weight w and bias b corresponding to each of the output values or a total input value u(Σz·w) is calculated using solely weight w corresponding to each of the output values at the node of the output layer. For example, an identity function is used as an activation function at the node of the output layer. In this case, the total input value u calculated at the node of the output layer is output as it is as the output value y from the node of the output layer.

Learning in Neural Network Model

In the embodiment, a value of each weight w and a value of each bias b in the neural network model are learned using an error back-propagation method. Since the error back-propagation method is well known, an outline of the error back-propagation method will be briefly described below. Since the bias b is a kind of the weight w, the bias b is one of the weights w in the following description.

In the neural network model as shown in FIG. 3, when the weight in the total input value $u^{(L)}$ to the node of each layer of L=2, L=3, or L=4 is represented by $w^{(L)}$, the differential of an error function E by the weight $w^{(L)}$, that is, a gradient $\partial E/\partial w^{(L)}$ is rewritten as the following equation.

[Formula 2]

$$\partial E/\partial w^{(L)} = (\partial E/\partial u^{(L)})(\partial u^{(L)}/\partial w^{(L)}) \quad (1)$$

Here, when $z^{(L-1)} \cdot \partial w^{(L)} = \partial u^{(L)}$ and $(\partial E/\partial u^{(L)}) = \delta^{(L)}$, the above equation (1) is converted to the following equation.

[Formula 3]

$$\partial E/\partial w^{(L)} = \delta^{(L)} \cdot z^{(L-1)} \quad (2)$$

Here, when $u^{(L)}$ fluctuates, the error function E fluctuates through a change in a total input value $u^{(L+1)}$ of the next layer. Therefore, $\delta^{(L)}$ can be represented by the following equation (K is the number of nodes in an L+1 layer).

[Formula 4]

$$\delta^{(L)} = \left(\frac{\partial E}{\partial u^{(L)}}\right) = \sum_{k=1}^{K} \left(\frac{\partial E}{\partial u_k^{(L+1)}}\right)\left(\frac{\partial u_k^{(L+1)}}{\partial u^{(L)}}\right) \quad (k = 1, 2, \ldots, K) \quad (3)$$

Here, when $z^{(L)} = f(u^{(L)})$, a total input value $u_k^{(L+1)}$ on the right side of the above equation (3) is represented by the following equation.

[Formula 5]

$$u_k^{(L+1)} = \sum_{k=1}^{K} w_k^{(L+1)} \cdot z^{(L)} = \sum_{k=1}^{K} w_k^{(L+1)} \cdot f(u^{(L)}) \quad (4)$$

Here, a first term $(\partial E/\partial u^{(L+1)})$ on the right side of the above equation (3) is $\delta^{(L+1)}$. Further, a second term $(\partial u_k^{(L+1)}/\partial u^{(L)})$ on the right side of the above equation (3) is represented by the following equation.

[Formula 6]

$$\partial(w_k^{(L+1)} \cdot z^{(L)})/\partial u^{(L)} = w_k^{(L+1)} \cdot \partial f(u^{(L)})/\partial u^{(L)} = w_k^{(L+1)} \cdot f'(u^{(L)}) \quad (5)$$

Therefore, $\delta^{(L)}$ is represented by the following equation.

[Formula 7]

$$\delta^{(L)} = \sum_{k=1}^{K} w_k^{(L+1)} \cdot \delta^{(L+1)} \cdot f^*(u^{(L)}) \quad (6)$$

that is, $$\delta^{(L-1)} = \sum_{k=1}^{K} w_k^{(L)} \cdot \delta^{(L)} \cdot f^*(u^{(L-1)})$$

That is, when $\delta^{(L+1)}$ is obtained, $\delta^{(L)}$ can be obtained.

When the learning of the neural network model is performed, a training data set including a certain input value x and correct answer data $y_t$ of an output value corresponding to the input value x is used. When the output value from an output layer corresponding to the certain input value x is y, the error function E is $E=\frac{1}{2}(y-y_t)^2$ when a square error is used as the error function. The output value $y=f(u^{(L)})$ at the node of the output layer (L=4) in FIG. 3. Therefore, the value of $\delta^{(L)}$ at the node of the output layer (L=4) is indicated by the following equation.

[Formula 8]

$$\delta^{(L)} = \partial E/\partial u^{(L)} = (\partial E/\partial y)(\partial y/\partial u^{(L)}) = (y-y_t) \cdot f'(u^{(L)}) \quad (7)$$

Here, when the activation function $f(u^{(L)})$ of the output layer is the identity function, $f'(u^{(L)})=1$. Therefore, $\delta^L=y-y_t$, and $\delta^{(L)}$ is obtained.

When $\delta^{(L)}$ is obtained, $\delta$ of the previous layer is obtained using the above equation (6). In this manner, $\delta$ of the previous layer is sequentially obtained, and the differential of the error function E with respect to each weight w, that is, the gradient $\partial E/\partial w^{(L)}$ is obtained using the value of $\delta$ from the above equation (2). When the gradient $\partial E/\partial w^{(L)}$ is obtained, the value of the weight w is updated using the gradient $\partial E/\partial w^{(L)}$ such that the value of the error function E decreases. That is, the learning of the neural network model is performed.

Problem of Neural Network Model in Related Art

The neural network model as described above includes one input layer, and the different types of input parameters (input values) correlated with the output parameter (output value) output from the output layer are input to each node of the input layer. As a result, the intermediate state quantities generated from the input parameters are sequentially converted in the intermediate layer, and finally the output parameter is output from the output layer.

In such a neural network model, basically, since an information amount for calculating the output parameter is larger as the number of input parameters is larger, calculation accuracy of the output parameter is improved. However, not all types of input parameters can be acquired. For example, when a target of the neural network model is the internal combustion engine 1, the injection density of the fuel injected from the fuel injection valve 21 and the spread of the injection affect a combustion result of the air-fuel mixture. However, it is difficult to measure the injection density and the spread of the injection. For this reason, the improvement of the calculation accuracy of the output parameter is desired with limited types of input parameters.

Neural Network Model in Embodiment

On the contrary, in the embodiment, the neural network model includes a plurality of input layers in order to increase the number of apparent input parameters. Specifically, the neural network model includes a plurality of neural network units and an output layer that outputs at least one output parameter based on outputs of the neural network units. Each of the neural network units includes one input layer and at least one intermediate layer. The neural network units have, for example, the same configuration (number of nodes of the input layer, number of intermediate layers, and number of nodes of each intermediate layer).

In the neural network model according to the embodiment, a set of input parameters including different types of input parameters is input to the input layers. In this case, it is conceivable to input the same combination of input parameters to the input layers in order to increase the total number of input parameters to be input to the neural network model. However, in this case, similar intermediate state quantities are generated in the neural network units. For this reason, it is impossible to increase the expressive power of the neural network model and thus to improve the calculation accuracy of the output parameter.

In the neural network model according to the embodiment, different combinations of input parameters selected from the input parameters are input to each of the input layers of the neural network units such that the total number of input parameters to be input to the neural network units is larger than the number of the input parameters acquired by the parameter acquisition unit 81. As a result, different intermediate state quantities are generated in the neural network units, and the output parameter is output from a plurality of intermediate state quantities. For this reason, it is possible to increase the expressive power of the neural network model and thus to improve the calculation accuracy of the output parameter without increasing the types of input parameters.

For example, when the number of the input parameters is n, the neural network model includes $_nC_k$ neural network units to which $_nC_k$ combinations of input parameters selected from the input parameters acquired by the parameter acquisition unit 81 are input. In this case, an equal number (k) of input parameters are input to each neural network unit. N is 3 or more and k is 2 to n−1 such that the different combinations of input parameters are input to each neural network unit. In this manner, it is possible to easily generate the neural network model capable of generating the different intermediate state quantities by selecting the number of neural network units and the combinations of input parameters.

Hereinafter, a specific example of the neural network model in the embodiment will be described. In the embodiment, the neural network model is a regression model that predicts at least one output parameter from the input parameters.

Figure 4:
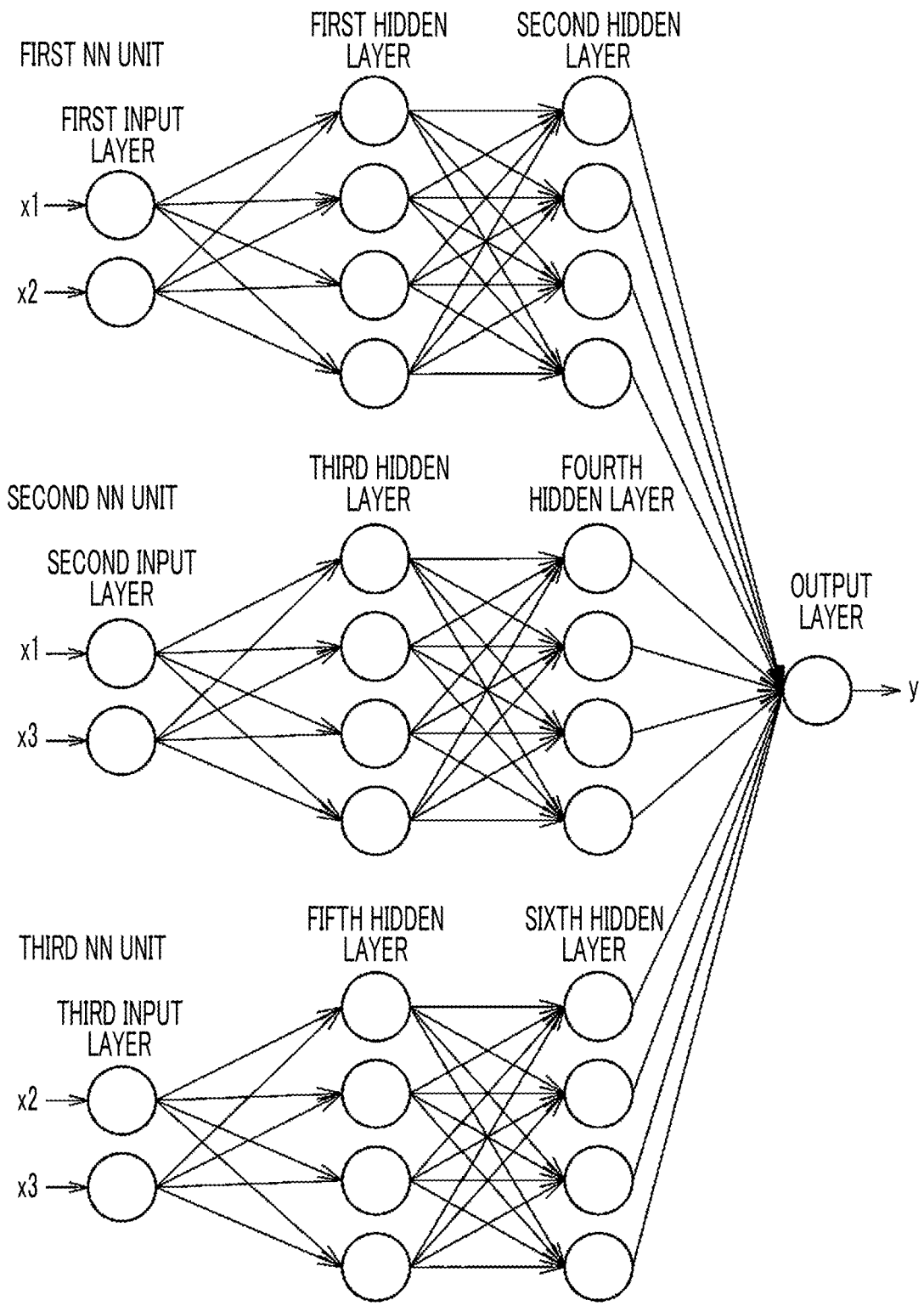
FIG. 4 is a diagram showing an example of the neural network according to the first embodiment.

FIG. 4 is a diagram showing an example of the neural network model in the first embodiment. In the example of FIG. 4, the number of input parameters to be acquired by the parameter acquisition unit 81 is three (x1, x2, and x3). The types of the three input parameters are different from each other.

As shown in FIG. 4, the neural network model includes a first neural network unit (referred to as a "first NN unit" in the specification), a second neural network unit (referred to as a "second NN unit" in the specification), a third neural network unit (referred to as a "third NN unit" in the specification), and an output layer. That is, the neural network model includes three neural network units.

The first neural network unit includes one input layer (a first input layer) and two hidden layers (a first hidden layer and a second hidden layer) directly or indirectly coupled to the input layer. A set of input parameters (x1 and x2) selected from a plurality of input parameters (x1, x2, and x3) is input to the first input layer. The number of nodes of the input layer is equal to the number of input parameters to be input to the input layer. For this reason, the first input layer has two nodes.

The first hidden layer is coupled to the first input layer, and outputs of the first input layer are input to the first hidden layer. Specifically, nodes of the first hidden layer are respectively coupled to all the nodes of the first input layer. For this reason, the outputs of all the nodes of the first input layer are respectively input to the nodes of the first hidden layer. In the example of FIG. 4, the first hidden layer has four nodes.

The second hidden layer is coupled to the first hidden layer, and outputs of the first hidden layer are input to the second hidden layer. Specifically, nodes of the second hidden layer are respectively coupled to all the nodes of the first hidden layer. For this reason, the outputs of all the nodes of the first hidden layer are respectively input to the nodes of the second hidden layer. In the example of FIG. 4, the second hidden layer has four nodes.

The second neural network unit has the same configuration as the first neural network unit and includes one input layer (a second input layer) and two hidden layers (a third hidden layer and a fourth hidden layer) directly or indirectly coupled to the input layer. A set of input parameters (x1 and x3) selected from the input parameters (x1, x2, and x3) are input to the second input layer.

The third neural network unit has the same configuration as the first neural network unit and includes one input layer (a third input layer) and two hidden layers (a fifth hidden layer and a sixth hidden layer) directly or indirectly coupled to the input layer. A set of input parameters (x2, and x3) selected from the input parameters (x1, x2, and x3) are input to the third input layer.

The output layer outputs an output parameter y based on the outputs of the first to third neural network units. For this reason, the output layer is coupled to the first to third neural network units, and the outputs of the first to third neural network units are input to the output layer.

Specifically, the output layer is coupled to the second hidden layer of the first neural network unit, the fourth hidden layer of the second neural network unit, and the sixth hidden layer of the third neural network unit. That is, a node of the output layer is coupled to all the nodes of the second hidden layer, the fourth hidden layer, and the sixth hidden layer. For this reason, the outputs of all the nodes of the second hidden layer, the fourth hidden layer, and the sixth hidden layer are input to the node of the output layer. The number of nodes of the output layer is equal to the number of output parameters to be output from the output layer. In the example of FIG. 4, the output layer outputs one output parameter y and has one node.

In the neural network model of FIG. 4, $_3C_2$ (=3) combinations of input parameters selected from the input parameters (x1, x2, and x3) are input to the input layer of $_3C_2$ (=3) neural network units. For this reason, a combination of input parameters (x1 and x2) to be input to the first input layer of the first neural network unit, a combination of input parameters (x1 and x3) to be input to the second input layer of the second neural network unit, and a combination of input parameters (x2, and x3) to be input to the third input layer of the third neural network unit are different from each other.

The first to third neural network units respectively have independent configurations. That is, there are no nodes coupled to each other between the different neural network units. For this reason, different intermediate state quantities are generated in each neural network unit, and output parameters are output based on the three intermediate state quantities. Therefore, it is possible to increase the expressive power of the neural network model and thus to improve the calculation accuracy of the output parameter without increasing the types of input parameters.

The number of neural network units may be two or more. For example, the first neural network unit, the second neural network unit, or the third neural network unit may be omitted.

The neural network units may have different configurations. For example, the number of input parameters to be input to each input layer may be different. That is, the number of nodes in each input layer may be different. For example, the three input parameters (x1, x2, and x3) may be input to the third input layer, and the third input layer may have three nodes.

The number of hidden layers in each neural network unit may be one or more. Further, the number of hidden layers in each neural network unit may be different. For example, the first neural network unit may include three hidden layers.

The number of nodes in each hidden layer may be one or more. Further, the number of nodes in each hidden layer may be different. For example, the first hidden layer may have eight nodes. The number of output parameters output from the output layer may be two or more. That is, the output layer may have two or more nodes.

Figure 5:
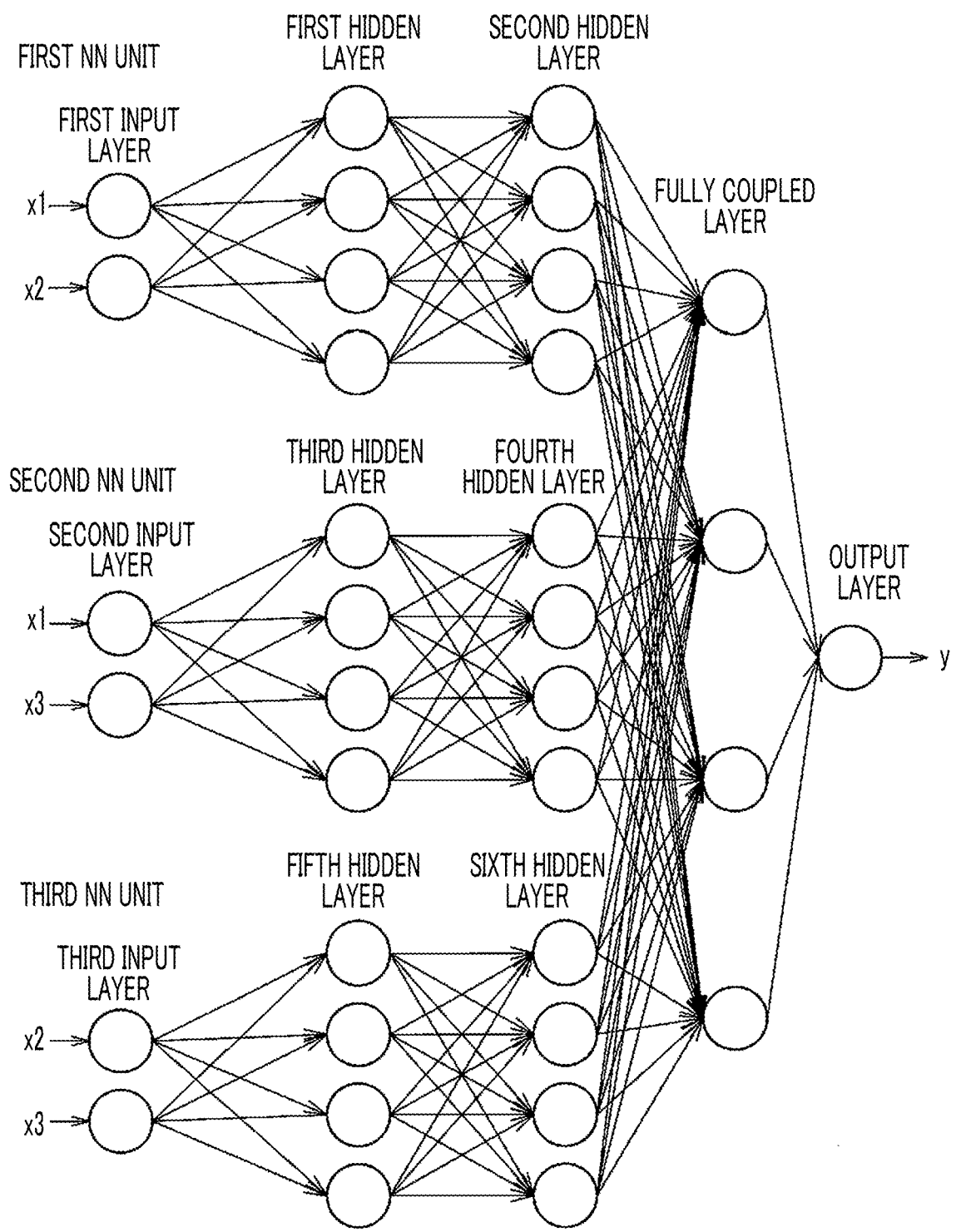
FIG. 5 is a diagram showing an example of the neural network according to the first embodiment.

As shown in FIG. 5, the neural network model may further include a fully coupled layer coupled to the output layer, and the neural network units may be coupled to the output layer through the fully coupled layer. The number of nodes of fully coupled layer may be one or more.

In the embodiment, the learning of the neural network model (that is, setting of the weight w and the bias b) is performed before the neural network model is mounted on the vehicle. In the learning of the neural network, a training data set including a combination of measured values of the input parameters and measured values (correct answer data) of at least one output parameter corresponding to the measured values is used. The measured values of the input parameters and the output parameter are acquired in advance using, for example, an engine bench, and the training data set is created in advance by combining the corresponding measured values.

In the learning of the neural network model, the weight w and the bias b in the neural network model are repeatedly updated by the error back-propagation method described above using a plurality of training data sets. As a result, the neural network is learned and a learned neural network model is generated. The learning of the neural network model is performed using, for example, a computer (for example, a computer mounted with a graphics processing unit (GPU)) installed in a production factory or the like. The generated learned neural network model is mounted on the ECU 61 provided in the vehicle before the vehicle is shipped. That is, information (model structure, weight w, bias b, and the like) on the learned neural network model is stored in the memory 63 of the ECU 61 or another storage device provided in the vehicle.

Figure 6:
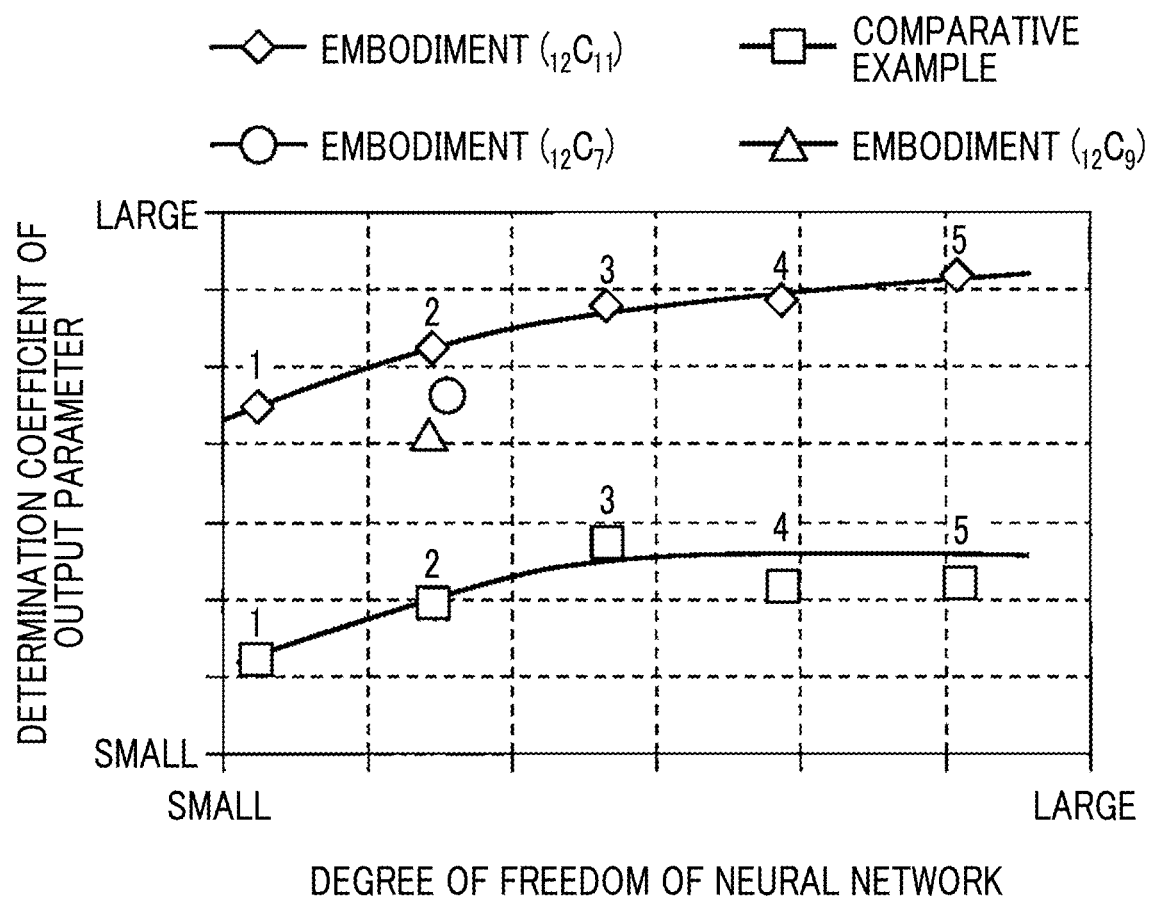
FIG. 6 is a graph showing a relationship between a degree of freedom of a neural network model and a determination coefficient of an output parameter.

FIG. 6 is a graph showing a relationship between a degree of freedom of the neural network model and a determination coefficient of the output parameter. The degree of freedom of the neural network model indicates the total number of weights and biases in the neural network model. For this reason, the degree of freedom of the neural network model is larger as the number of input layers, the number of nodes of the input layer, the number of hidden layers, and the number of nodes of the hidden layers are larger.

A determination coefficient $R^2$ of the output parameter is calculated by the following equation and takes a value of zero to one. The calculation accuracy of the output parameter is higher as the determination coefficient $R^2$ of the output parameter is closer to one. $R^2$=(sum of deviation squares of calculated values of output parameters)/(sum of deviation squares of measured values of output parameters), where the calculated values of output parameters are values output by the learned neural network model and the measured values of output parameters are values actually measured using a sensor or the like.

In FIG. 6, results using a learned first neural network model according to the embodiment are plotted with diamonds, and results using the learned neural network model in a comparative example are plotted with squares. The number above each data point indicates the number of intermediate layers. FIG. 6 shows the results when the number of intermediate layers is changed from one to five in each neural network model.

Figure 7:
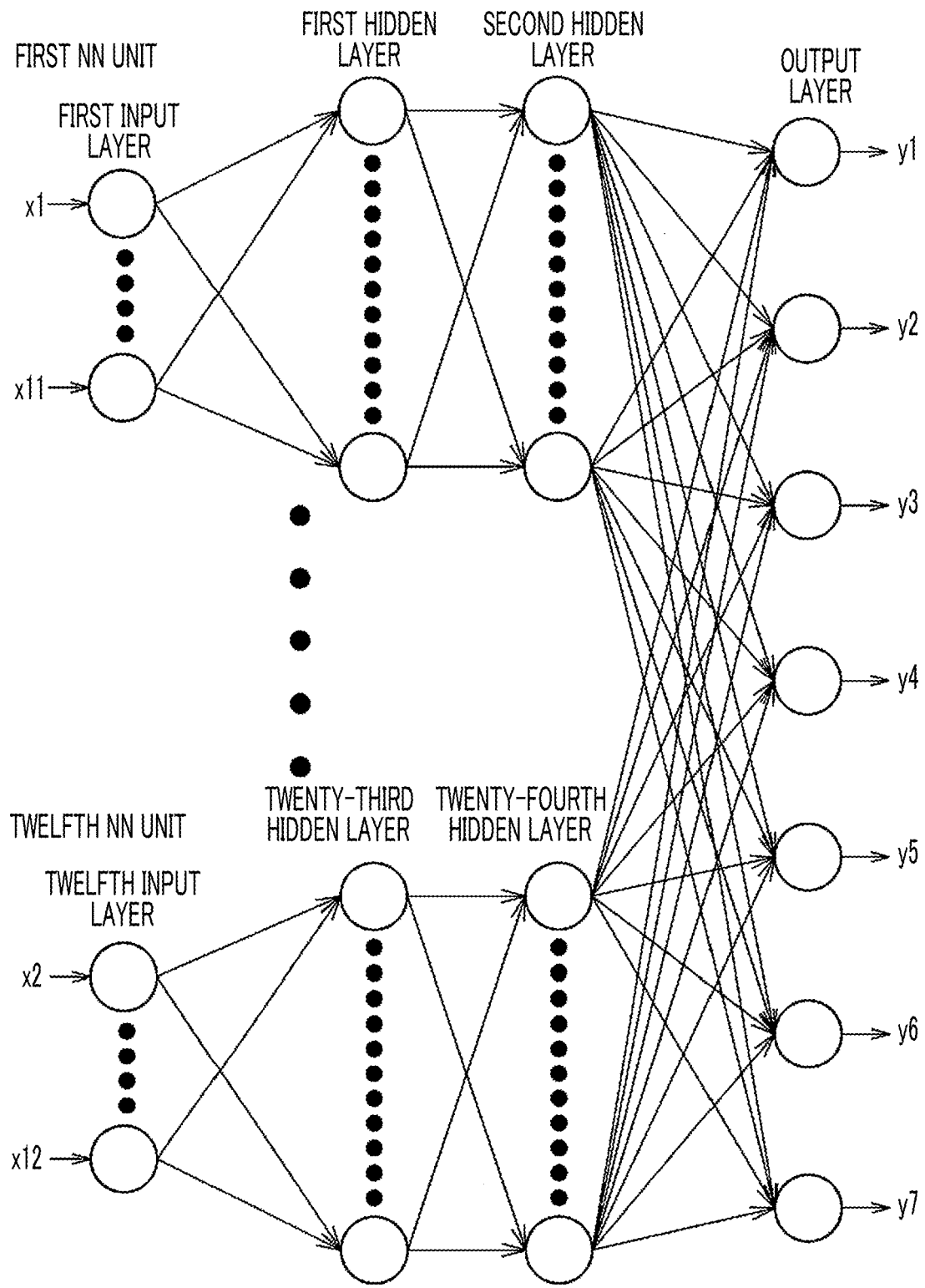
FIG. 7 is a diagram schematically showing a configuration of a first neural network model according to the embodiment.

FIG. 7 is a diagram schematically showing a configuration of the first neural network model according to the embodiment. FIG. 7 shows the configuration of the first neural network model when the number of intermediate layers is two. The target of the first neural network model is the internal combustion engine 1.

In the first neural network model, the output layer has seven nodes and outputs seven types of output parameters y1 to y7 relating to an operation state of the internal combustion engine 1. The y1 is output torque of the internal combustion engine 1. The y2 is a sound pressure of a combustion sound. The y3 is a crank angle (CA50) at which a combustion ratio becomes 50%. The y4 is a nitrogen oxide (NOx) concentration in the exhaust gas. The y5 is a carbon monoxide (CO) concentration in the exhaust gas. The y6 is a hydrocarbon (HC) concentration in the exhaust gas. The y7 is a smoke concentration in the exhaust gas.

In the first neural network model, 12 types of parameters (x1 to x12) relating to the operation state of the internal combustion engine 1 and correlated with the output parameters are used as input parameters. The x1 is a fuel injection amount in a main injection. The x2 is a fuel injection timing in the main injection. The x3 is a fuel injection amount in a first pilot injection. The x4 is a fuel injection timing in the first pilot injection. The x5 is a fuel injection amount in a second pilot injection. The x6 is a fuel injection timing in the second pilot injection. The x7 is a fuel injection pressure. The x8 is an intake air temperature. The x9 is an intake air pressure. The x10 is the EGR rate. The x11 is the fresh air amount. The x12 is an amount of gas flowing into the cylinder 11.

The values of the input parameters are, for example, measured by a sensor or the like as described below or calculated by the ECU 61. The x1 to x6 are calculated based on a command value to be output from the ECU 61 to the fuel injection valve 21. The x7 is calculated based on an output of the fuel pressure sensor 74. The x8 is measured by the intake air temperature sensor 72. The x9 is measured by the intake air pressure sensor 73. The x10 is calculated based on a command value to be output from the ECU 61 to the EGR control valve 52. The x11 is measured by the air flow meter 71. The x12 is calculated based on an output of the air flow meter 71 and the command value to be output from the ECU 61 to the EGR control valve 52.

As shown in FIG. 7, the first neural network model has $_{12}C_{11}$ (=12) neural network units (a first neural network unit (referred to as a "first NN unit" in the specification) to 12th neural network unit (referred to as a "12th NN unit" in the specification)). The $_{12}C_{11}$ (=12) combinations of input parameters selected from the 12 types of parameters (x1 to x12) are input to the 12 neural network units. For example, eleven input parameters x1 to x11 are input to the first input layer of the first NN unit, and eleven input parameters x2 to x12 are input to the 12th input layer of the 12th NN unit.

On the other hand, the neural network model in the comparative example has a simple configuration as shown in FIG. 3, and outputs seven types of output parameters from the above 12 types of input parameters. Therefore, the neural network model in the comparative example includes an input layer having 12 nodes and an output layer having seven nodes. In the first neural network model and the neural network model in the comparative example, the number of nodes of the intermediate layer is set such that the degrees of freedom of the neural network models are equal when the number of intermediate layers is the same. The determination coefficient of the output parameter is calculated as an average value of the determination coefficients of the seven types of output parameters (y1 to y7).

As can be seen from FIG. 6, the first neural network model has a larger determination coefficient of the output parameter with respect to the degree of freedom of the neural network model than that in the comparative example. Therefore, the first neural network model has higher calculation accuracy of the output parameter than the neural network model in the comparative example.

In FIG. 6, the results using a learned second neural network model according to the embodiment are plotted with circles, and the results using a learned third neural network model in the embodiment are plotted with triangles. The second neural network model includes $_{12}C_7$ (=792) neural network units, and $_{12}C_7$ (=792) combinations of input parameters are input to 792 neural network units. The third neural network model includes $_{12}C_9$ (=220) neural network units, and $_{12}C_9$ (=220) combinations of input parameters are input to 220 neural network units. In the second neural network model and the third neural network model, solely the results when the number of intermediate layers is two are shown.

As can be seen from FIG. 6, it is possible to improve the calculation accuracy of the output parameter also in the second neural network model and the third neural network model as compared with the neural network model in the comparative example. Therefore, in the embodiment, when the neural network model includes $_nC_k$ neural network units to which $_nC_k$ combinations of input parameters are input, k can be set to any number from 2 to n−1.

Figure 8:
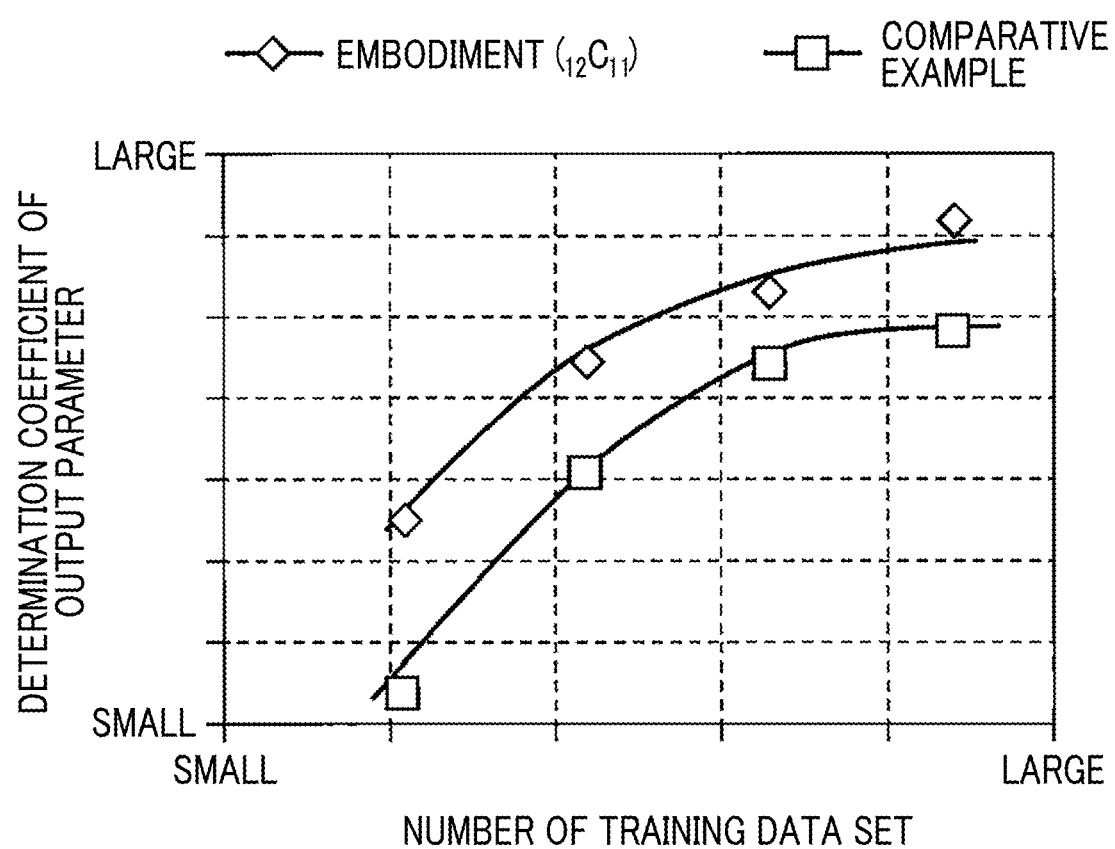
FIG. 8 is a graph showing a relationship between the number of training data sets used for learning the neural network model and the determination coefficient of the output parameter.

FIG. 8 is a graph showing a relationship between the number of training data sets used for learning the neural network model and the determination coefficient of the output parameter. In FIG. 8, results using the learned first neural network model according to the embodiment are plotted with diamonds, and results using the learned neural network model in the comparative example are plotted with squares. Each of the first neural network model and the neural network model in the comparative example has three intermediate layers.

As can be seen from FIG. 8, the number of training data sets needed to obtain the same determination coefficient in the first neural network model is smaller than that in the neural network model in the comparative example. Therefore, in the neural network model in the embodiment, it is possible to reduce the number of training data sets needed to obtain predetermined calculation accuracy of the output parameter and thus to reduce a learning time of the neural network model.

Flowchart

Figure 9:
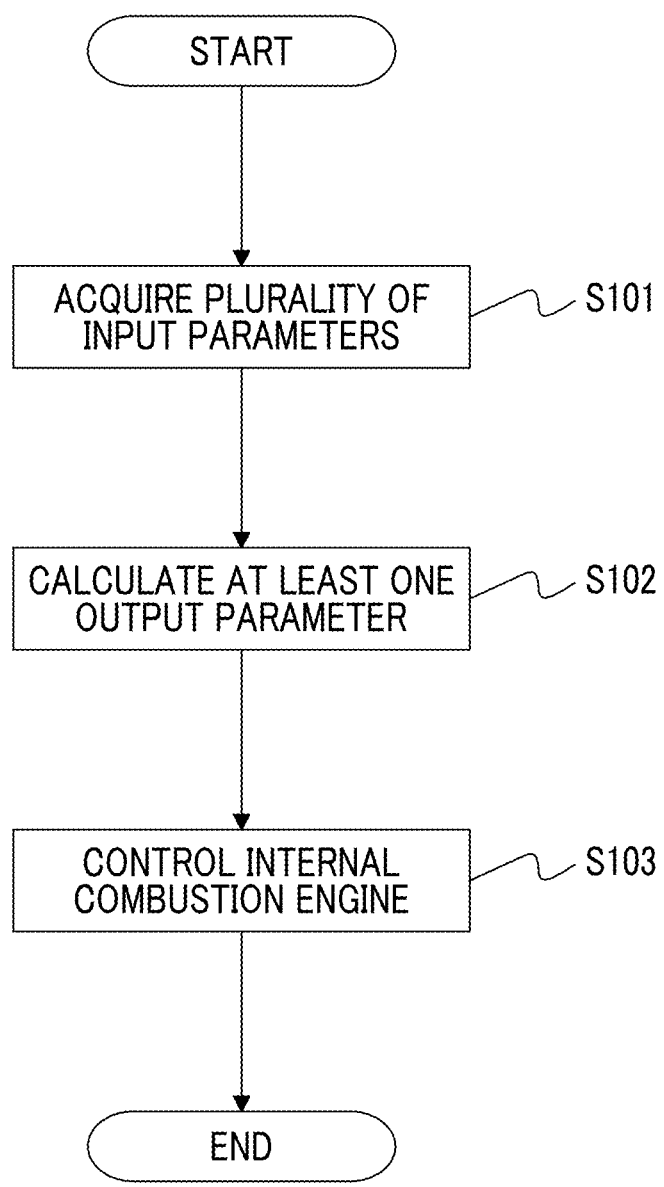
FIG. 9 is a flowchart showing a control routine for controlling the internal combustion engine according to the first embodiment.

FIG. 9 is a flowchart showing a control routine for controlling the internal combustion engine according to the first embodiment. The control routine of FIG. 9 is repeatedly executed by the ECU 61 at a predetermined execution interval. The predetermined execution interval is, for example, a time of one cycle of the internal combustion engine 1.

First, in step S101, the parameter acquisition unit 81 acquires the input parameters to be input to the neural network model. The input parameters are mutually different types of parameters, for example, parameters relating to the operation state of the internal combustion engine 1. The input parameters are measured by the sensor or the like or calculated by the ECU 61 according to the types of the input parameters.

Next, in step S102, the calculation unit 82 calculates at least one output parameter based on the input parameters acquired by the parameter acquisition unit 81 using the neural network model. The at least one output parameter is, for example, a parameter relating to the operation state of the internal combustion engine 1. The neural network model includes the neural network units and the output layer that outputs the at least one output parameter based on the outputs of the neural network units. The calculation unit 82 inputs the different combinations of input parameters selected from the input parameters acquired by the parameter acquisition unit 81 to the neural network units to cause the neural network model to output the output parameter.

Next, in step S103, the controller 83 controls the internal combustion engine 1 based on the at least one output parameter calculated by the calculation unit 82. Specifically, the controller 83 controls the internal combustion engine 1 such that the output parameter is included in a predetermined target range. For example, when the at least one output parameter includes the NOx concentration in the exhaust gas, the controller 83 causes the opening degree of the EGR control valve 52 to increase such that the NOx concentration decreases when a predicted value of the NOx concentration calculated by the calculation unit 82 is higher than the target range. After step S103, the control routine ends.

Second Embodiment

A configuration and control of the electronic control unit used in a machine learning system according to a second embodiment are basically the same as those of the electronic control unit in the first embodiment.

For this reason, hereinafter, the second embodiment of the disclosure will be described with a focus on differences from the first embodiment.

In the second embodiment, the neural network model is learned in a server outside the vehicle, and the learned neural network model is transmitted from the server to the vehicle. As a result, it is possible to replace or add the neural network model as needed and to mount the neural network model for calculating a desired output parameter on the vehicle after the vehicle is shipped. Further, it is possible to improve prediction accuracy of the output parameter by updating the weight or the like of the neural network model by communicating with the server.

Figure 10:
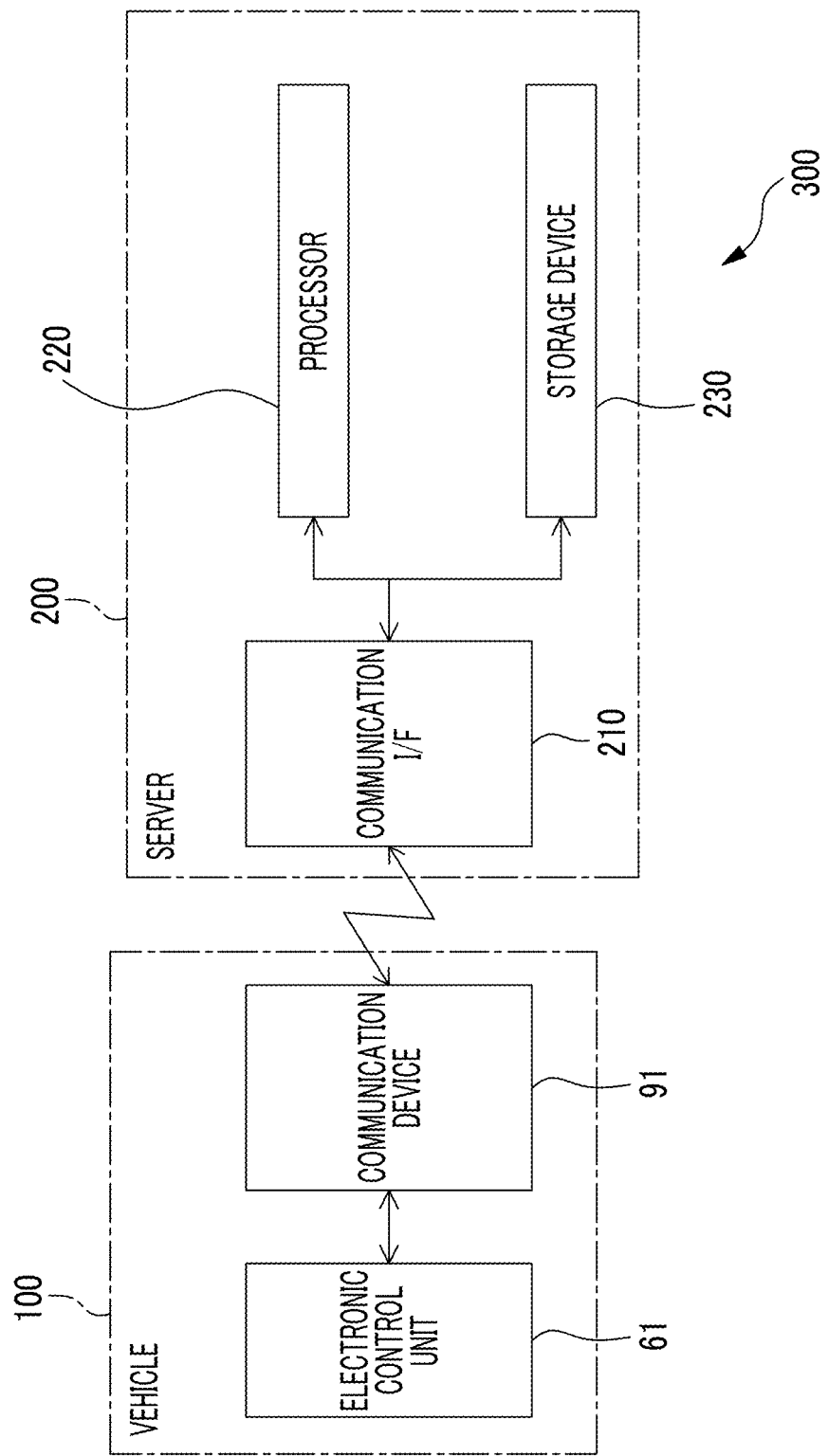
FIG. 10 is a diagram schematically showing a machine learning system according to a second embodiment.

FIG. 10 is a diagram schematically showing the machine learning system according to the second embodiment. A machine learning system 300 includes the electronic control unit (ECU) 61 and a communication device 91 which are provided in a vehicle 100 and a server 200 outside the vehicle 100. Similar to the first embodiment, as shown in FIG. 2, the ECU 61 includes the parameter acquisition unit 81, the calculation unit 82, and the controller 83.

The ECU 61 and the communication device 91 are communicably connected to each other through an in-vehicle network compliant with a standard such as a controller area network (CAN). The communication device 91 is communicable with the server 200 through a communication network and is, for example, a data communication module (DCM). The communication between the communication device 91 and the server 200 is performed by wireless communication compliant with various communication standards.

The server 200 includes a communication interface 210, a storage device 230, and a processor 220. The communication interface 210 and the storage device 230 are connected to the processor 220 through signal lines. The server 200 may further include an input device such as a keyboard and a mouse, an output device such as a display, and the like.

The communication interface 210 has an interface circuit for connecting the server 200 to the communication device 91 of the vehicle 100 through the communication network. The storage device 230 is configured of, for example, a hard disk drive (HDD), a solid state drive (SDD), an optical recording medium, a semiconductor memory such as a random access memory (RAM), and the like.

The storage device 230 stores various pieces of data. Specifically, the storage device 230 stores a training data set used for learning the neural network model and a computer program for performing the learning of the neural network model. The training data set includes a combination of measured values of a plurality of input parameters and measured values of at least one output parameter corresponding to the measured values. The measured values of the input parameters and the output parameter are acquired in advance using, for example, the engine bench, and the training data set is created in advance by combining the corresponding measured values. The measured values of the input parameters and the output parameter may be acquired by another vehicle different from the vehicle 100 and transmitted to the server 200 from a communication device provided in another vehicle.

The server 200 learns the neural network using the training data set and generates a learned neural network model. Specifically, the server 200 repeatedly updates weight w and bias b of the neural network by using the error back-propagation method described above using a plurality of training data sets. As a result, the weight w and the bias b of the neural network converge to appropriate values, and the learned neural network model is generated. The neural network model in the second embodiment has a configuration similar to that in the first embodiment (for example, refer to FIGS. 4, 5, and 7).

The learned neural network model is transmitted from the server 200 to the ECU 61 of the vehicle 100 through the communication interface 210 of the server 200 and the communication device 91 of the vehicle 100. As a result, information (model structure, weight w, bias b, and the like) on the learned neural network model is stored in the memory 63 of the ECU 61 or another storage device provided in the vehicle 100.

The calculation unit 82 of the ECU 61 calculate the at least one output parameter based on the input parameters using the learned neural network model transmitted from the server 200 to the vehicle 100. The control routine of FIG. 9 is executed similar to the first embodiment, and the controller 83 controls the internal combustion engine 1 based on the at least one output parameter calculated by the calculation unit 82.

Third Embodiment

A configuration and control of a machine learning system according to a third embodiment are basically the same as the machine learning system according to the second embodiment. For this reason, hereinafter, the third embodiment of the disclosure will be described with a focus on differences from the second embodiment.

In the third embodiment, similar to the second embodiment, the neural network model is learned in a server outside a vehicle, and the learned neural network model is transmitted from the server to the vehicle. On the other hand, in the third embodiment, measured values of input parameter and output parameter are acquired in the vehicle in order to create a training data set. As a result, it is possible to easily prepare a plurality of training data sets using the vehicle.

Similar to the second embodiment, as shown in FIG. 10, the machine learning system 300 includes the electronic control unit (ECU) 61 and the communication device 91 which are provided in the vehicle 100 and the server 200 outside the vehicle 100. Similar to the first embodiment, as shown in FIG. 2, the ECU 61 includes the parameter acquisition unit 81, the calculation unit 82, and the controller 83.

The parameter acquisition unit 81 acquires a plurality of input parameters and at least one output parameter used in the neural network model. The input parameters and the at least one output parameter are measured by a sensor or the like or calculated by the ECU 61 according to the types of parameters. For example, when the at least one output parameter includes output torque of the internal combustion engine 1, a torque sensor is disposed on an output shaft (crankshaft) of the internal combustion engine 1 and the output torque of the internal combustion engine 1 is measured by the torque sensor.

The parameter acquisition unit 81 transmits the input parameters and the at least one output parameter to the server 200 through the communication device 91. A combination of the input parameters and the at least one output parameter transmitted to the server 200 is stored in the storage device 230 of the server 200 as the training data set.

The server 200 learns a neural network using the training data set including the combination of the input parameters and the at least one output parameter acquired by the parameter acquisition unit 81 and generates the learned neural network model. Specifically, the server 200 repeatedly updates weight w and bias b of the neural network by using the error back-propagation method described above using the training data sets. As a result, the weight w and the bias b of the neural network converge to appropriate values, and the learned neural network model is generated.

Similarly to the second embodiment, the server 200 transmits the learned neural network model to the ECU 61 of the vehicle 100. The calculation unit 82 of the ECU 61 calculate the at least one output parameter based on the input parameters using the learned neural network model transmitted from the server 200 to the vehicle 100. As a result, it is possible to obtain a predicted value of an output parameter corresponding to the input parameter having a predetermined value before the output parameter is measured by a sensor or the like. The control routine of FIG. 9 is executed similar to the first embodiment, and the controller 83 controls the internal combustion engine 1 based on the at least one output parameter calculated by the calculation unit 82.

Fourth Embodiment

A configuration and control of a control device of an internal combustion engine according to a fourth embodiment are basically the same as those of the control device of the internal combustion engine in the first embodiment. For this reason, hereinafter, the fourth embodiment of the disclosure will be described with a focus on differences from the first embodiment.

In the fourth embodiment, similar to the third embodiment, measured values of input parameters and output parameters are acquired in a vehicle in order to create a training data set. On the other hand, in the fourth embodiment, learning of the neural network model is performed in the vehicle. As a result, it is possible to efficiently perform the learning of the neural network model in the vehicle without using a server or the like.

Figure 11:
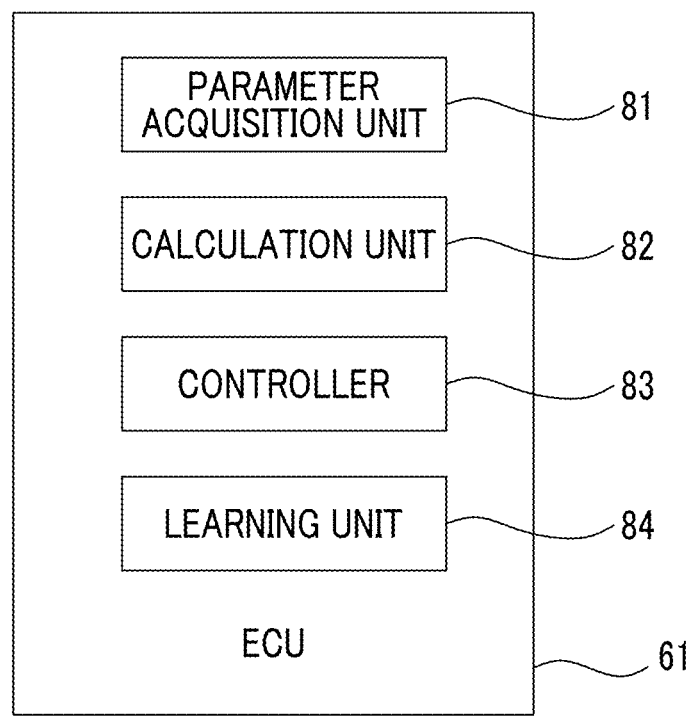
FIG. 11 is a functional block diagram of an ECU according to a fourth embodiment.

FIG. 11 is a functional block diagram of the ECU 61 in the fourth embodiment. In the fourth embodiment, the ECU 61 includes a learning unit 84 in addition to the parameter acquisition unit 81, the calculation unit 82, and the controller 83. Similar to the third embodiment, the parameter acquisition unit 81 acquires a plurality of input parameters and at least one output parameter used in the neural network model. A combination of the input parameters and the at least one output parameter acquired by the parameter acquisition unit 81 is stored as the training data set in the memory 63 of the ECU 61 or another storage device provided in the vehicle.

The learning unit 84 learns a neural network using the training data set including the combination of the input parameters and the at least one output parameter acquired by the parameter acquisition unit 81 and generates a learned neural network model. Specifically, the learning unit 84 repeatedly updates weight w and bias b of the neural network by using the error back-propagation method described above using a plurality of training data sets. As a result, the weight w and the bias b of the neural network converge to appropriate values, and the learned neural network model is generated.

The calculation unit 82 calculates the at least one output parameter based on the input parameters using the learned neural network model. As a result, it is possible to obtain a predicted value of the output parameter corresponding to the input parameter having a predetermined value before the output parameter is measured by a sensor or the like. The control routine of FIG. 9 is executed similar to the first embodiment, and the controller 83 controls the internal combustion engine 1 based on the at least one output parameter calculated by the calculation unit 82.

Other Embodiments

The preferred embodiments according to the disclosure are described above. However, the disclosure is not limited to these embodiments, and various modifications and changes can be made within the scope of the claims. For example, the target of the neural network model used in an in-vehicle electronic control unit (ECU 61) may be anything relating to the vehicle other than the internal combustion engine 1 described above.

For example, the target of the neural network model used in the in-vehicle electronic control unit may be a spark ignition internal combustion engine (for example, a gasoline engine). When the spark ignition internal combustion engine includes the port fuel injection valve that injects the fuel into the intake port and the in-cylinder fuel injection valve that directly injects the fuel into the cylinder, for example, the following types of parameters are selected as the input parameter to be input to the neural network model and the output parameter to be output from the neural network model. As the input parameter, for example, the engine speed, the fuel injection amount of the port fuel injection valve, the fuel injection timing of the port fuel injection valve, the intake air temperature, the intake air pressure, the opening degree of the EGR control valve, the intake air amount, the fuel injection amount of the in-cylinder fuel injection valve, the fuel injection timing of the in-cylinder fuel injection valve, and the injection pressure of the in-cylinder fuel injection valve are used. As the output parameter, for example, an ignition timing of the air-fuel mixture, a combustion period of the air-fuel mixture, the concentration of harmful substances (NOx, HC, CO, smoke, and the like) in the exhaust gas, and a maximum calorific value due to the combustion of the air-fuel mixture are used.

The target of the neural network model used in the in-vehicle electronic control unit may be a battery or a motor provided in a hybrid vehicle (HV), a plug-in hybrid vehicle (PHV), or an electric vehicle (EV). When the target of the neural network model is the battery, for example, the following types of parameters are selected as the input parameter to be input to the neural network model and the output parameter to be output from the neural network model. As the input parameter, for example, a battery voltage, a battery current, a vehicle continuous operation time, and a vehicle speed are used. As the output parameter, for example, a state of charge (SOC) of the battery, a degree of deterioration of the battery, and a temperature of the battery are used.

When the target of the neural network model is the motor, for example, the following types of parameters are selected as the input parameter to be input to the neural network model and the output parameter to be output from the neural network model. As the input parameter, for example, a motor voltage, a motor current, and a motor speed are used. As the output parameter, for example, shaft torque of the motor and a motor temperature are used.

The neural network model as described above may be used in an output parameter calculation device. The output parameter calculation device includes a parameter acquisition unit that acquires a plurality of input parameters and a calculation unit that calculates at least one output parameter based on the input parameters acquired by the parameter acquisition unit using the neural network model. The output parameter calculation device has, for example, a central processing unit (CPU), a GPU, a field programmable gate array (FPGA), or an application specific integrated circuit (ASIC) as a hardware configuration. The target of the neural network model used in the output parameter calculation device is not limited to a target relating to the vehicle. For example, the target of the neural network model may be a machine tool or the like.

What is claimed is:

1. A control device of an internal combustion engine, the control device comprising:
   a parameter acquisition unit configured to acquire a plurality of input parameters;
   a calculation unit configured to calculate at least one output parameter based on the input parameters acquired by the parameter acquisition unit using a neural network model; and
   a controller configured to control the internal combustion engine based on the at least one output parameter calculated by the calculation unit, wherein:
   the neural network model includes a plurality of neural network units and an output layer that outputs the at least one output parameter based on outputs of the neural network units;
   each of the neural network units includes one input layer and at least one intermediate layer; and
   the neural network model is configured to input different combinations of input parameters selected from the input parameters to each of the input layers of the neural network units such that a total number of combinations of input parameters to be input to the neural network units is larger than the number of the input parameters, wherein:
   the number of the input parameters is n; and
   the neural network model includes $_nC_k$ neural network units to which $_nC_k$ combinations of input parameters selected from the input parameters are input, where n is three or more and k is two to n−1.

2. The control device according to claim 1, further comprising:
   a learning unit configured to perform learning of the neural network model in a vehicle mounted with the internal combustion engine, wherein:
   the parameter acquisition unit is configured to acquire the input parameters and the at least one output parameter; and
   the learning unit is configured to perform the learning of the neural network model using a training data set including a combination of the input parameters and the at least one output parameter acquired by the parameter acquisition unit.

3. A control method of an internal combustion engine, the control method comprising:
   acquiring a plurality of input parameters;
   calculating at least one output parameter based on the input parameters using a neural network model; and
   controlling the internal combustion engine based on the at least one output parameter, wherein:
   the neural network model includes a plurality of neural network units and an output layer that outputs the at least one output parameter based on outputs of the neural network units;
   each of the neural network units includes one input layer and at least one intermediate layer; and
   the neural network model is configured to input different combinations of input parameters selected from the input parameters to each of the input layers of the neural network units such that a total number of input parameters to be input to the neural network units is larger than the number of the input parameters, wherein:
   the number of the input parameters is n; and
   the neural network model includes $_nC_k$ neural network units to which $_nC_k$ combinations of input parameters selected from the input parameters are input, where n is three or more and k is two to n−1.

4. An output parameter calculation device comprising:
a parameter acquisition unit configured to acquire a plurality of input parameters; and
a calculation unit configured to calculate at least one output parameter based on the input parameters acquired by the parameter acquisition unit using a neural network model, wherein:
the neural network model includes a plurality of neural network units and an output layer that outputs the at least one output parameter based on outputs of the neural network units;
each of the neural network units includes one input layer and at least one intermediate layer; and
the neural network model is configured to input different combinations of input parameters selected from the input parameters to each of the input layers of the neural network units such that a total number of input parameters to be input to the neural network units is larger than the number of the input parameters, wherein:
the number of the input parameters is n; and
the neural network model includes $_nC_k$ neural network units to which $_nC_k$ combinations of input parameters selected from the input parameters are input, where n is three or more and k is two to n−1.

5. The control device according to claim 1, wherein the neural network is received from a server outside a vehicle by the vehicle.

6. The control method according to claim 3, further comprising receiving the neural network from a server outside of a vehicle including the internal combustion engine.

7. The control method according to claim 3, further comprising:
learning by the neural network model in a vehicle mounted with the internal combustion engine, wherein:
acquiring the plurality of input parameters further comprises acquiring the at least one output parameter; and
the learning of the neural network model comprises using a training data set including a combination of the input parameters and the at least one output parameter.

8. The output parameter calculation device according to claim 4, wherein the neural network is received from a server outside a vehicle by the vehicle.

9. The output parameter calculation device according to claim 4, further comprising:
a learning unit configured to perform learning of the neural network model in a vehicle mounted with the internal combustion engine, wherein:
the parameter acquisition unit is configured to acquire the input parameters and the at least one output parameter; and
the learning unit is configured to perform the learning of the neural network model using a training data set including a combination of the input parameters and the at least one output parameter acquired by the parameter acquisition unit.

* * * * *